United States Patent [19]

Hernandez

[11] Patent Number: 4,724,964

[45] Date of Patent: Feb. 16, 1988

[54] REUSABLE PLASTIC CONTAINER MOUNTED TO BACKING BOARD

[75] Inventor: Carlos Hernandez, Miami, Fla.

[73] Assignee: Blispack Corporation, Hialeah, Fla.

[21] Appl. No.: 36,313

[22] Filed: Apr. 9, 1987

[51] Int. Cl.⁴ .............................................. B65D 5/66
[52] U.S. Cl. .................................... 206/461; 206/462; 206/470
[58] Field of Search ................................. 206/459–471

[56] References Cited

U.S. PATENT DOCUMENTS

| | | | |
|---|---|---|---|
| 3,111,220 | 11/1963 | Bostrom | 206/462 X |
| 3,394,801 | 7/1968 | Hanson | 206/470 |
| 4,202,464 | 5/1980 | Mohs et al. | 206/515 X |
| 4,687,129 | 8/1987 | Cugley | 206/470 X |

Primary Examiner—William Price
Attorney, Agent, or Firm—John Cyril Malloy

[57] ABSTRACT

A reusable container normally mounted to a backing board for display purposes, and on which backing board advertising is adapted to be set forth, and wherein the container is composed of a receptacle and a lid with the lid being normally closed. The receptacle and lid have mutually companionate confronting surfaces to interconnect the two in close relation by heat sealing. The lid includes an outwardly extending peripheral side zone adapted to be connected such as by heat sealing to the backing board in the central zone and through which receptacle articles on display may be examined by a prospective purchaser.

11 Claims, 8 Drawing Figures

REUSABLE PLASTIC CONTAINER MOUNTED TO BACKING BOARD

FIELD OF THE INVENTION

This invention relates to display packages for items.

BACKGROUND OF THE INVENTION

In the past there have been numerous devices for displaying articles of selected quantity in hardware stores, for example. Some methods have utilized a blister package, however, once the package is open, if there are for example eight or ten screws, and only two are needed, there is no convenient place to keep the other screws except perhaps in the jar mixing them with many other items. In view of this problem, among others, the prior art teaches the development of a reusable transparent plastic container such as that shown in U.S. Pat. No. 4,202,464 to Mohs, et al. In that patent, a container is provided that is wrapped with a advertising sheet which serves to maintain the container lid in closed relation. This device only provides a limited area for advertising materials and information about the contents of the box and, further, contents of the box is obscured by the label. The present invention is of a box in many respect similar to that taught and described in U.S. Pat. No. 4,202,464; however, differing in that the hanging tab for the container is on a flange on the front wall of the receptacle while a peripheral zone of the lid extends outwardly in confronting relation to a flange on the side walls of the receptacle providing wing zones which may be heat sealed to a backing board of substantial display size and for the flange and peripheral zone are adapted to be heat sealed together to maintain them in a normally closed position while mounted on a backing board. In general, the improved construction provides for the display of relatively small items in relatively small packages with substantial advertising on a backing board informing a customer of the advantages of the product and its specifications and also providing a relatively large package which is not apt to be stolen as is the case with the small package of U.S. Pat. No. 4,202,464, which is not constructed in such a way as to adapt it for mounting, as shown in FIG. 1 of the drawings attached.

OBJECTS OF THE INVENTION

It is an object of this invention to provide a clear plastic container with a hingedly connected lid and receptacle with a windowed floor in the receptacle and out-turned flanges on the lid and receptacle adapting the lid to be mounted to a backing board in a central zone and the receptacle to be normally maintained in close relation with the flanges, with the flanges of the lid and receptacle being interconnected.

It is general object of this invention to provide a simple and inexpensive transparent display package which is adapted to be hung from a hook and which includes a soft centering tab with a hole in it and a windowed floor for visibly displaying a wide range of products and which container is adapted to be reused, the same being of one piece plastic construction, preferably P.V.C., polyvinylchloride, and which is strong and durable and well adapted for the purposes for which it is intended.

In accordance with these and other objects for which will become apparent hereinafter the instant invention will now be described with reference to the accompanying drawings.

DESCRIPTION OF THE PREFERRED EMBODIMENT

Figure 1:
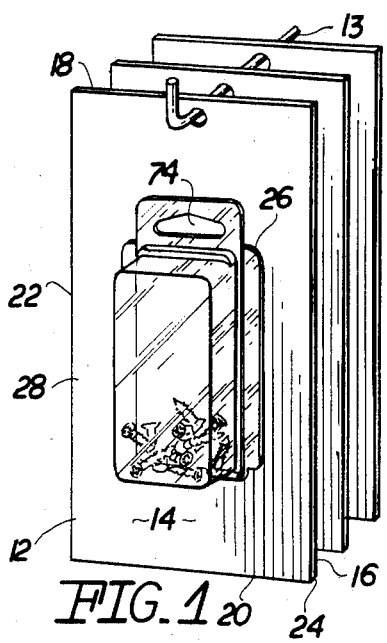
FIG. 1 is a perspective view illustrating the combination of the backing board and container fixed thereto for display.
Figure 2:
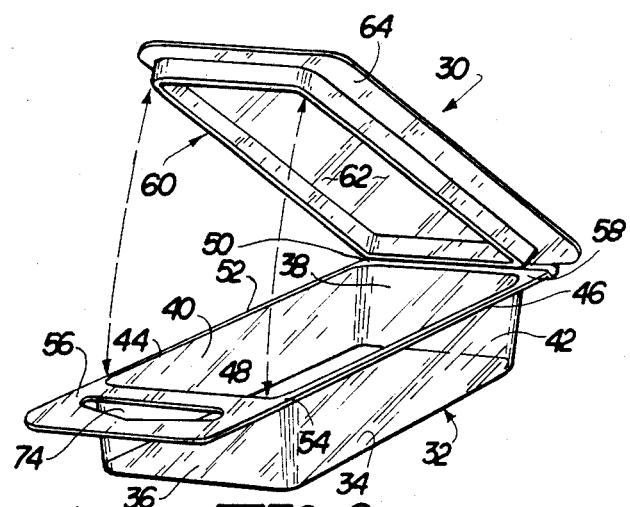
FIG. 2 is a perspective view of the receptacle.
Figure 3:
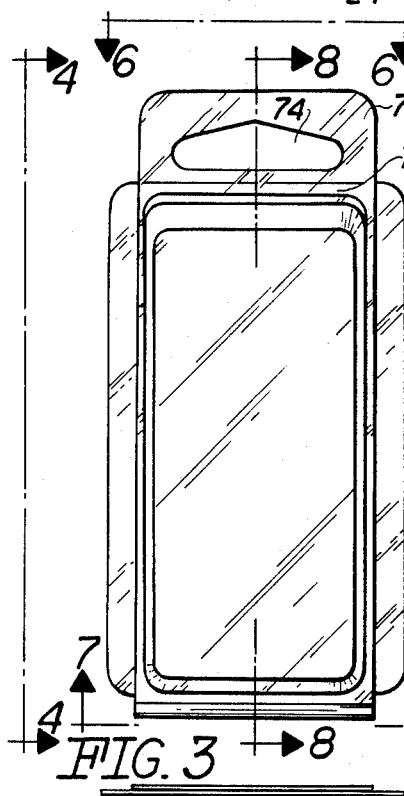
FIG. 3 is a plan view of the receptacle as seen from the bottom of FIG. 2.
Figure 4:
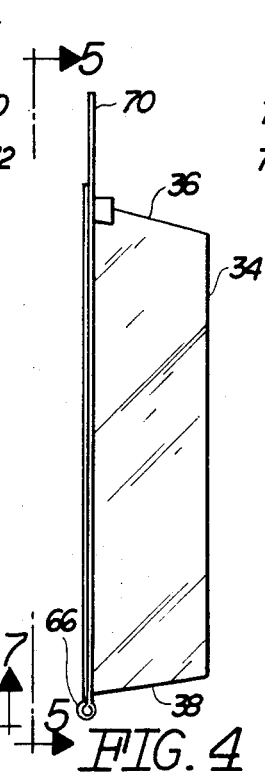
FIG. 4 is a view taken on the plane indicated by the line 4—4 of FIG. 3 and looking in the direction of the arrow.

Referring to the drawings wherein like reference characters designate like or corresponding parts throughout the several views and referring particularly to FIG. 1, there is shown a planar backing board 12 on a hook 13 with a reclosable container thereon. The planar backing board 12 has an outer surface 14 and an inner surface 16 as well as an upper edge 18, a lower edge 20 and side edges 22 and 24. The outer surface may be considered as having a central zone 26 which is bounded by a border zone 28 between the outer edges and the central zone. The integral reclosable containers 30 are adapted to be secured as shown in FIG. 1, for example, to the backing board. This container 30 is a thin flexible, transparent, thermoplastic form plastic material, preferably P.V.C. or polyvinylchloride. The container generally is composed of a receptacle means 32 and a lid 60 hingedly connected to it.

The receptacle means 32 includes a flat rectangular transparent floor 34 and wall means in upstanding relation on the floor. The wall means include a planar front wall 36, rear wall 38 and opposing side walls 40 and 42, which are joined together and which are of a common height. Each of the walls terminates a generally coplanar edge 44, 46, 48 and 50, each with a respective out-turned generally coplanar peripheral flange 52, 54, 56 and 58. There is thus defined at the edges an open mouth for the receptacle into which articles may be charged, such as nuts, bolts, screws and the charged receptacle utilized for display, such as in a hardware store.

Figure 5:
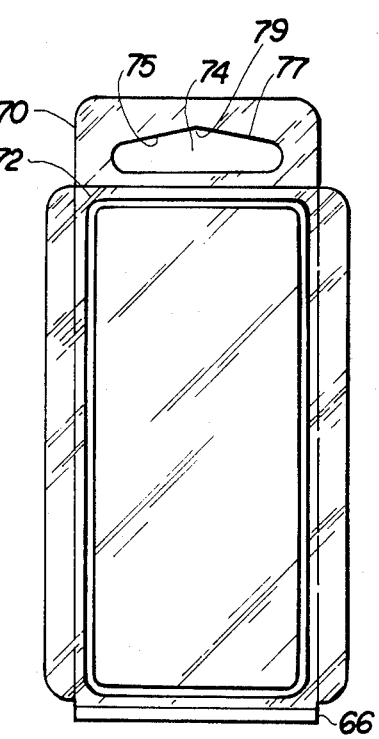
FIG. 5 is a view taken on the plane indicated by the line 5—5 of FIG. 4 and looking in the direction of the arrow.
Figure 6:
FIG. 6 is a view and cross-section taken on the plane indicated by the line 6—6 of FIG. 3 and looking in the direction of the arrow.
Figure 7:
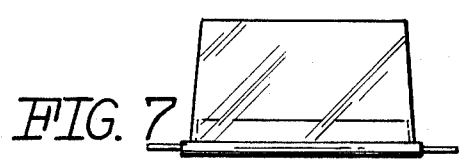
FIG. 7 is a view taken on the plane indicated by line 7—7 of FIG. 3 and looking in the direction of the arrow.
Figure 8:
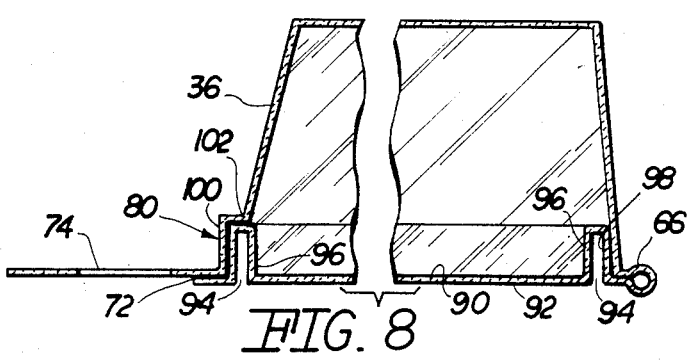
FIG. 8 is a view in cross-section taken on the plane indicated by the line 8—8 of FIG. 3 and looking in the direction of the arrows.

The lid 60 may be considered to have a central zone 62 and a coplanar peripheral zone 64. The hinge means which is generally designated by the numeral 66 hingedly interconnects the lid to the receptacle at the rear end wall so that the lid is swingable between an open and a normally closed position. When the lid is in the closed position, the central zone, which is sized to close the receptacle mouth, overlays it while the peripheral zone extends outwardly. The hinge means specifically interconnects the peripheral zone and the peripheral flange along the rear wall. It is seen that the peripheral flange extends outwardly of the front wall and beyond the peripheral zone defining a tab 70 for the container, it be noted that a portion of the flange end zone overlay one another in confronting relation along a strip 72 parallel to the front wall terminal edge. In the tab, a hanging hole 74 is provided with the tab hole having edges 75 and 77 which diverge from the center line of the receptacle as seen in FIG. 5 from an apex 79 so that the device is self centering when hung on a hook as shown in FIG. 1.

The peripheral zone of the lid extends outwardly beyond the flange along each of the side walls with a portion of the flange being in coplanar confronting relation with the peripheral zone along each of the side walls. This peripheral zone outboard of the confronting portions of the side walls flanges and the peripheral zone provides a surface to secure by heat sealing or other means the thermoplastic material to the exterior or outer surface of the central zone of the backing board. While the strip 72 permits heat sealing of the lid to the container. In the preferred embodiment, mutually inter-engaging means are provided on the lid between the central and peripheral zones and on the wall means of the receptacle means to provide lateral stiffening of the container when the lid is in a closed position. In a preferred embodiment, this may take the form of groove 94 being formed in the outer surface 92 of the lid so that side walls 96 and 98 extend as shoulders into the receptacle from the inner surface 90 of the lid with the outer wall 98 being in confronting relation and nested against the side wall of the receptacle. Preferably, there is a shelf 102 provided in the front wall so that the mutually interengaging means 80 includes a portion of the lid which dwells on a shelf 102 which is companionately formed and sized to receive it in snug relationship to maintain the lid and receptacle in close relationship relative to one another, this construction being more fully described in U.S. Pat. No. 4,202,464.

It is thus apparent that there is provided a reusable display package for items such screws, nuts, bolts and the like which is simple and inexpensive to manufacture and which is adapted to be mounted for display on a blister package yet removable therefrom so that a user may have reusable container which is adapted to be suspended from a hook or to rest on a surface, such as a counter top. Thus, when small items are displayed, the container is not maintained in a closed position by reason of a advertising sheet being wrapped about it which must be removed and which is of limited area for advertising, but rather substantial space as required may be provided on the backing board which is intended to be disposed of when after the purchase is made or left attached for identification of the packed item, without ever interfering with the reclosing property of the box.

What is claimed is:

1. In combination,
a planar backing board 12 having a central zone 26 bounded by a border zone 28 between edges of said backing board and said central zone;
an impact integral reclosable container 30 of thin, flexible, transparent thermoplastic, formed plastic material comprising:
a receptacle means 32 including:
a flat rectangular floor 34 and wall means about said floor,
said wall means including planar front 36 and rear 38 end walls and opposing side walls 40, 42 joining the front and rear end walls 36 and 38, said walls being of a generally common height, each having a generally coplanar terminal edge 44, 46, 48, 50 with out-turned generally coplanar peripheral flange 52, 54, 56, 58 and defining at said edges an open mouth for charging articles thereinto, and
a lid with a central region 62 and a coplanar peripheral zones 64,
hinge means 66 hingedly interconnecting the lid peripheral zone to the rear end wall flange, said lid being swingable between an open and a normally closed position and, when in said closed position said central region being sized to close said receptacle mouth,
said hinge means interconnecting said peripheral zone and said flange along said rear wall,
said flange 52, 54, 56, and 58 extending outwardly of said front end wall 36 and beyond said peripheral zone 64 defining a container tab 70 and with a portion of said peripheral zone proximate said front end being a front end zone overlaying said flange proximate said front end in confronting relation along a strip 72 parallel to said front wall terminal edge,
said tab 70 having a hanging hole centrally located in said tab,
said peripheral zone 64 of said lid extending outwardly beyond said flange 52, 54, 56, and 58 along each of said side walls with a portion of said flange being in coplanar confronting relation with said peripheral zone along each of said walls,
means for securing said peripheral zone outboard of said confronting portions of said flange to said outer surface central zone of said backing board,
means securing said peripheral zone 64 and said flange 52, 54, 56, and 58 along said strip 72 inboard of said tab along and adjacent said front wall,
mutually inter-engaging means on said lid between said central and peripheral zones and on said side walls providing lateral stiffening of said container when said lid is a closed position.

2. The device as set forth in claim 1 wherein said plastic material is clear P.V.C. plastic.

3. The device as set forth in claim 1 wherein said lid of said receptacle has an interior face and an exterior face, a groove formed in said exterior face defining an inner and outer wall extending from said inner face with said outer wall having a surface in confronting relation with said walls of said receptacle means 32.

4. The device as set forth in claim 3 wherein said receptacle front wall 36 is provided with a shelf 102 therealong and said outer wall of said lid has a companionate shoulder 96 to dwell upon and nest in said receptacle with said shelf and said lid in confronting relation providing keeper means to normally maintain said lid and receptacle in said close position.

5. The device as set forth in claim 1 wherein said border zone 28 of said backing board extends outwardly of said container along said flange and said peripheral zone.

6. The device as set forth in claim 5 wherein said backing board borders said peripheral zone along said rear wall flange and said peripheral zone of said lid extends laterally outwardly of said container beyond said flange.

7. The device as set forth in claim 1 wherein said hanging hole in said tab is defined by a top edge which diverges symetrically and downwardly towards said receptacle from an apex, said apex being midway between the side walls of said receptacle.

8. In combination,
a planar backing board 12 having a cut-out central zone bounded by a border;
a reclosable container of transparent plastic material comprising:
a receptacle means including:
a flat rectangular floor and wall means about said floor including planar front, rear and opposing side walls all of a generally common height, each wall having a generally coplanar terminal edge with out-turned generally coplanar peripheral flange and defining at said terminal edges an open mouth for charging articles thereinto, and
a lid with a central zone and a coplanar peripheral zones,
hinge means hingedly interconnecting one of the lid's peripheral zone to the rear end wall flange, said lid being swingable between an open and a normally closed position and, when in said closed position, defining a completely enclosed container for the charged articles due to said central zone being sized to close said receptacle mouth,
the peripheral flange of the front end wall extending outwardly thereof beyond said peripheral zone thereof and defining a container tab and with a portion of a first lid peripheral zone and said peripheral flange overlaying one another in confronting relation along a strip parallel to said front wall terminal edge,
said peripheral zone of said lid extending outwardly beyond said peripheral flange along each of said side walls with a portion of said peripheral flange being in coplanar confronting relation with said peripheral zone along each of said walls,
means securing said peripheral zone outboard of said confronting portions of said peripheral flange to said border when said receptacle is disposed in said cut-out.
means securing said peripheral zone and said peripheral flange along said strip inboard of said tab along and adjacent said front wall; and,
mutually inter-engaging means on said lid between said central and peripheral zones and on said side walls providing lateral stiffening of said container when said lid is a closed position.

9. The device as set forth in claim 18 wherein said plastic material is clear P.V.C. plastic.

10. The device as set forth in claim 8 wherein said lid of said receptacle has an interior face and an exterior face, a groove formed in said exterior face defining an inner and outer wall extending from said inner face with said outer wall having a surface in confronting relation with said walls of said receptacle means.

11. The device as set forth in claim 10 wherein said receptacle front wall is provided with a shelf therealong and said outer wall of said lid has a companionate shoulder to dwell upon and nest in said receptacle at said shoulder and said lid in confronting relation providing keeper means to normally maintain said lid and receptacle in said closed position.

* * * * *